Patented Mar. 3, 1931

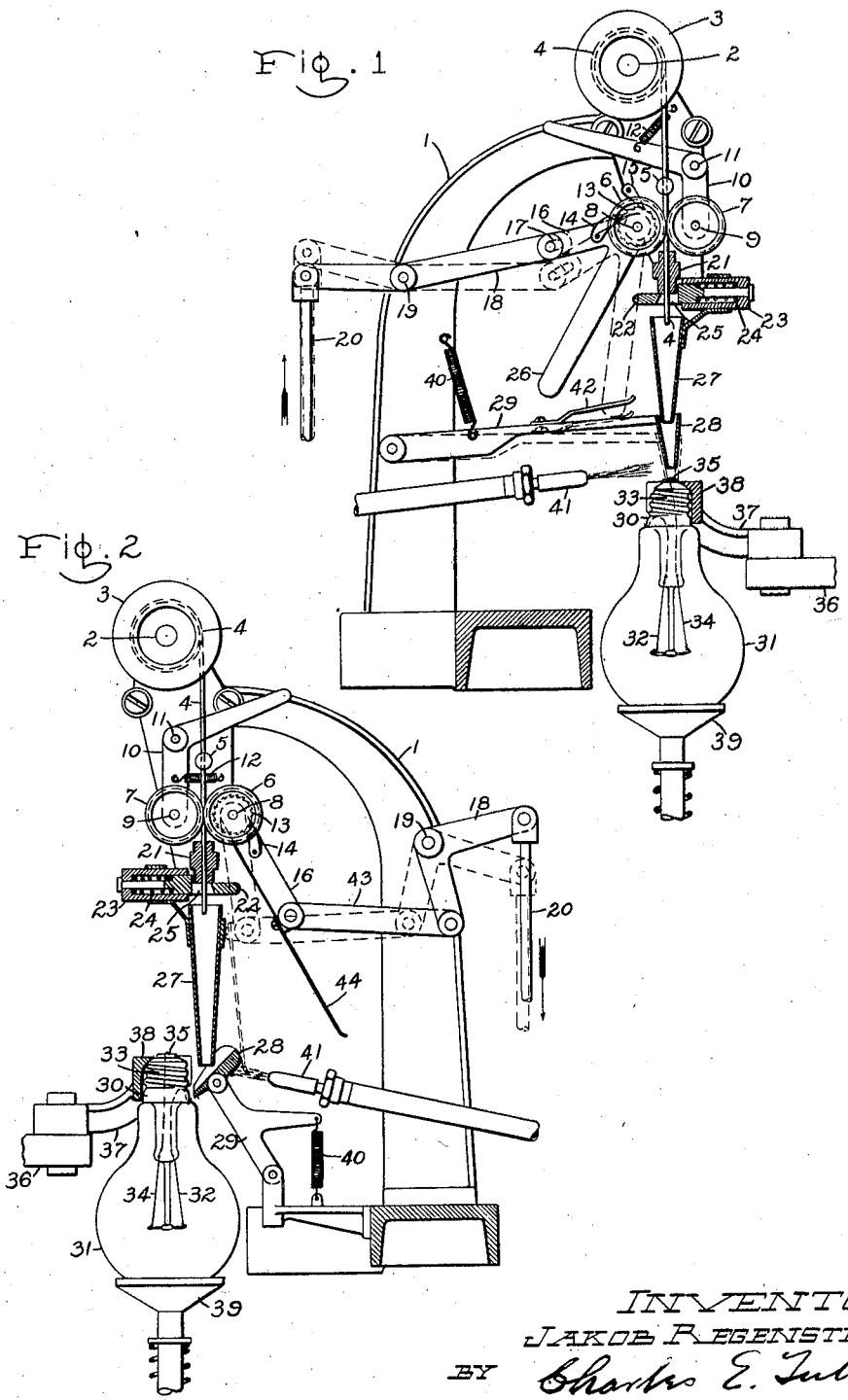

1,794,733

UNITED STATES PATENT OFFICE

JAKOB REGENSTREIF, OF BERLIN, GERMANY, ASSIGNOR TO GENERAL ELECTRIC COMPANY, A CORPORATION OF NEW YORK

SOLDERING MACHINE FOR INCANDESCENT LAMPS AND SIMILAR DEVICES

Application filed August 21, 1929, Serial No. 387,510, and in Germany June 20, 1928.

My invention relates to methods and apparatus for soldering the leading-in wires of incandescent lamps to their bases, where particles of solder are brought automatically to the designated place on the base of the lamp. In apparatus of this kind, the solder is melted by the heat imparted to the base in order to harden the cement or by direct contact of a small flame directed upon these particular places.

The purpose of my invention is to provide automatic melting and applying of solder particles in a quick reliable manner as well as confining the molten solder to a small space on the base. Hollow or slotted soldering irons are placed directly on or as close as possible to the points to be soldered. Into these irons fall particles of solder which upon being melted are directed against the point to be soldered. In order that the spreading of the molten solder be prevented as much as possible, the heated soldering irons are kept a short distance away from the base whenever the soldering process is not being performed. When the soldering is to take place the irons are pressed against the places to be soldered.

In the drawing, Fig. 1 is a side elevation of a device embodying my invention which solders the leading-in wire protruding directly from the top of the base; and Fig. 2 is a side elevation of a similar device used in soldering the leading-in wire which protrudes from the side of the base.

In the drawing, the frame 1 supports shaft 2 on which the spool 3 of soldering wire 4 is placed. The soldering wire may have a flux core consisting of some flux such as zinc chloride. On leaving the spool 3, the soldering wire 4 travels down through the drilled guide pin 5 and then between the feeding rollers 6 and 7. One of the feeding rollers 6 rotates on the pin 8 fastened directly to the frame 1, the other, 7, rotates on the pin 9 fastened to lever 10 which is free to move about the pin 11. Pressure produced by the spring 12 holds the roller 7 against the soldering wire sufficiently tight so as to provide a feeding means. Fastened directly to the roller 6 is the ratchet wheel 13 which meshes with the ratchet pawls 14 and 15. Ratchet pawl 14 which produces the feeding motion is attached to the lever 16. This lever is operated through the slot 17 of the arm 18. The main operating arm 18 having its fulcrum at the pin 19 is oscillated by means of the rod 20. This rod driven from the machine of which the soldering device is a part, is so timed in its operation that the device only operates whenever a lamp is in the position for soldering. Inasmuch as rollers 6 and 7 participate in the feeding of the soldering wire, the movement of the rod 20 will feed a proportional amount of soldering wire. After passing between the rollers 6 and 7, the soldering wire moves down through the sleeve 21 over whose lower opening is the knife 22. This knife 22 slides horizontally in the sleeve 23 which encloses spring 24 that holds the opening 25 in the knife over the mouth of the sleeve 21 whenever the knife is not in operation. Downward motion of the rod draws the pawl 14 against the ratchet wheel 15 thus feeding a length of soldering wire through the knife opening 25. Upward motion of the rod 20 draws down the lever 26 until it strikes the knife thus cutting off a length of soldering wire. The cut-off particle of soldering wire drops through the funnel 27 into the bore or slot of the heated soldering iron 28. The funnel 27 is fastened directly to the stationary sleeve 23 but the iron 28 swings from the arm 29. Below or to the side of the soldering iron 28 there is the base 30 and the bulb 31. The leading-in wire 32 protrudes from the side of the shell 33 and the other leading-in wire 34 protrudes from the eyelet 35 of the base.

In the particular arrangement shown in the drawing, the soldering device is built as a part of a basing machine. This machine has a large spider 36 which carries a number of arms 37 on which the base holding caps 38 are mounted. The bulb 31 is held from the bottom by the cup 39 which partakes of the same intermittent motion as the spider 36. After the lamps placed in the basing machine have passed the heating positions provided for hardening the cement, they come in succession into the soldering positions. Because of the spring 40, the irons 28 are pulled back a short distance from the base whenever the device is not soldering so as not to interfere with the rotation of the basing machine. As shown in Fig. 1, the soldering iron 28 is brought in contact with the base 30 by the pressure of the arm 26 upon the spring 42 which allows for any irregularity in the base. The irons are heated externally to a red heat by the adjustable burner 41 so that the particles of solder are not only directed to their position on the base but melted at the same time. The drop of solder on leaving the soldering iron will cover the protruding end of the leading-in wire with absolute certainty, leaving a small uniformly soldered surface. The device shown in Fig. 2 for soldering the leading-in wire protruding from the side of the base varies only slightly from that shown in Fig. 1. This device varies principally from that of Fig. 1 in that it is not mounted over the base but at one side where a slotted iron 28 directs the solder particles against the side of the base. In this case the levers 16 and 18 are of a different shape and are connected by the bar 43. The spring 44 forces the soldering iron to swing against the base with the downward movement (in this case) of the rod 20.

The mechanisms shown are mounted on the basing machine so there are always two lamps in succession being soldered simultaneously, the lamp having one leading-in wire soldered at each of the two positions on the basing machine. The heated hollow soldering iron may be rigidly mounted and may also be pressed against the base by means entirely independent of the solder conveying device. The heating of the hollow iron may be done electrically and the knife 22 may be replaced with one having a scissor-like action or by a flame. Other variations could be included such as differently shaped conveying means for the solder particles and a device for automatically feeding small particles of solder. These solder particles may be flat-pin, spherical or of some other shape. Solder wire containing flux is not necessary as flux may be applied by a small oscillating brush. It is also possible to hold the lamps by hand during the soldering process. My invention is not only applicable to electric lamps, but also to other large containers which are provided with leading-in wires and bases or caps, for instance, X-ray tubes, rectifiers and amplifiers.

What I claim as new and desire to secure by Letters Patent of the United States is:

In combination with movable means for supporting an incandescent lamp or similar article comprising a pair of leads and a base in a substantially vertical position with said base uppermost, an apparatus for soldering the ends of the said lead wires to a center contact on the top of said base and to the side of a shell comprised by said base respectively, comprising soldering irons mounted adjacent to the positions of the ends of said wires, means for feeding pieces of solder to said soldering irons, means for moving said soldering irons to contact the ends of said wires, and means whereby the movement of said soldering irons are properly timed with the movement of said supporting means.

In witness whereof, I have hereunto set my hand this 7th day of August, 1929.

JAKOB REGENSTREIF.